(12) United States Patent
Passler et al.

(10) Patent No.: US 10,847,866 B2
(45) Date of Patent: Nov. 24, 2020

(54) AIRBORNE ANTENNA POINTING AND PROJECTION

(71) Applicant: SR Technologies, Inc., Davie, FL (US)

(72) Inventors: Mark Passler, Boca Raton, FL (US); Graham K. Smith, Boca Raton, FL (US); Steven M. Romanow, North Lauderdale, FL (US)

(73) Assignee: SR Technologies, Inc., Sunrise, FL (US)

( * ) Notice: Subject to any disclaimer, the term of this patent is extended or adjusted under 35 U.S.C. 154(b) by 83 days.

(21) Appl. No.: 16/358,051

(22) Filed: Mar. 19, 2019

(65) Prior Publication Data

US 2019/0296420 A1  Sep. 26, 2019

Related U.S. Application Data

(60) Provisional application No. 62/648,028, filed on Mar. 26, 2018.

(51) Int. Cl.
*H01Q 1/12* (2006.01)
*H01Q 3/04* (2006.01)

(52) U.S. Cl.
CPC ............. *H01Q 1/1257* (2013.01); *H01Q 3/04* (2013.01)

(58) Field of Classification Search
CPC ........ H01Q 1/125; H01Q 1/1257; H01Q 3/02; H01Q 3/04
See application file for complete search history.

(56) References Cited

U.S. PATENT DOCUMENTS

| 7,561,098 B2 * | 7/2009 | Christianson ......... G01S 7/4026 342/200 |
| 8,717,226 B2 * | 5/2014 | Bon ...................... G01S 7/4026 342/75 |
| 2014/0168010 A1 * | 6/2014 | Mohamadi ......... H04B 7/18506 342/357.39 |

* cited by examiner

*Primary Examiner* — Hoang V Nguyen
(74) *Attorney, Agent, or Firm* — Christopher & Weisberg, P.A.

(57) ABSTRACT

A method and computer for pointing a beam of a directional antenna located above ground is disclosed. A method includes receiving a beam width $2\phi$, and determining an angle $\psi_{max}$ where $\psi_{max}+\theta$ is an angle for a projection of maximum signal strength on the ground. $\psi_{max}$ is based on the beam width $2\phi$ and tilt angle $\theta$. The method also includes determining an effective ground beam width defined by a total relative gain of the directional antenna and the above the ground to ground range being at half the maximum signal strength on the ground at angles above and below $\psi_{max}$. The method further includes determining a ground footprint of the beam based at least on part on the determined effective ground beam width, and causing the antenna to be pointed based at least in part on the determined ground footprint of the beam.

20 Claims, 13 Drawing Sheets

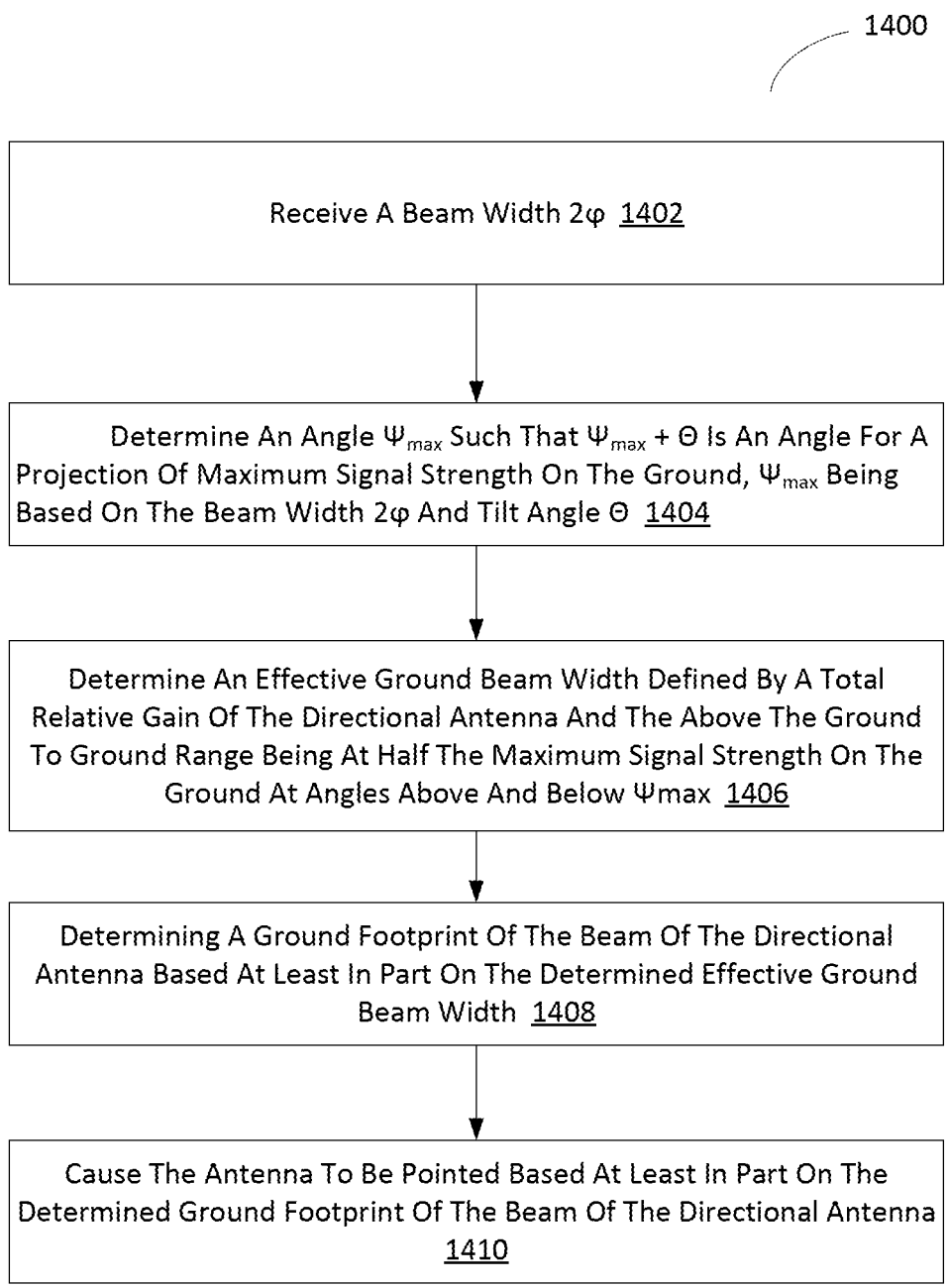

… (1)

AIRBORNE ANTENNA POINTING AND PROJECTION

CROSS-REFERENCE TO RELATED APPLICATION

This application is related to and claims priority to U.S. Provisional Patent Application Ser. No. 62/648,028, filed Mar. 26, 2018, entitled, "AIRBORNE ANTENNA POINTING AND PROJECTION", the entirety of which is incorporated herein by reference.

FIELD

This disclosure relates to antenna systems and in particular to pointing the beam of an airborne directional antenna.

BACKGROUND

A directional antenna is an antenna which radiates or receives greater power in specific directions as compared to other directions, and typically defines the antenna beam width as the angle subtended by the directions where the antenna gain is −3 dB compared to the maximum gain. A directional antenna will have a beam width in the horizontal and the vertical planes. When a directional antenna is positioned at a height above the ground, in an aircraft for example, and the antenna is generally pointed towards the ground, it is beneficial to show the antenna coverage superimposed on a display of the ground map. It is also beneficial to point the antenna at the ground based area or point of interest.

FIG. 1 is an exemplary plot of the gain of a typical directional antenna. The antenna vertical gain plot 10 is displayed in dBs against direction. The plot is shown in polar form with the direction angle 20 and the maximum gain axis 30. In this example, the maximum gain 30 is shown at the direction 90 degrees. In this example at about 110 degrees 40 the gain is at −3 db compared to the maximum gain 30 at 90 degrees. Similarly, at about 70 degrees 50 the gain is also at −3 db compared to the maximum gain 30 at 90 degrees. Hence the vertical beam width for this example antenna is about 40 degrees.

FIG. 2 is a diagrammatical representation of a directional antenna 100 positioned above the earth's surface showing the effective antenna projection 140 on the earth's surface. The directional antenna 100 is positioned at a tilt angle $\theta_1$ 105 and the projection 110 represents the direction of maximum antenna gain at the tilt angle $\theta_1$ 105. The tilt angle is also referred to herein as the angle of declination. Assuming the directional antenna 100 has a vertical beam width of 2Φ, 106 and 107, then projection 120 representing a −3 dB antenna gain, is at a pitch angle of ($\theta_1$−Φ) and projection 130, representing the other −3 dB antenna gain, is at a pitch angle of ($\theta_1$+Φ) where projections 120 and 130 represent the 3 dB antenna beam width.

FIG. 3 is a diagrammatical representation of a directional antenna 100 positioned above the earth's surface at a tilt angle $\theta_2$ 205 where $\theta_2$ 205 is a smaller angle than $\theta_1$ 105 shown in FIG. 2. Directional antenna 100 has a beam width of 2Φ, 106 and 107. Projection 210 represents the direction of maximum antenna gain at the tilt angle $\theta_2$ 205 and projections 220 and 230 represent the −3 dB antenna gain far and near projections at pitch angles of ($\theta_2$−Φ) and ($\theta_2$+Φ) respectively. Note that in this example the distance on the ground 242 between the maximum antenna gain projection 210 and the −3 dB far projection 220 is greater than the distance on the ground 241 between the maximum gain projection 210 and −3 dB near projection 230. The spot 245 on the ground corresponds to the maximum ground projection. Common practice is to point the antenna to the area of interest on the ground such that the maximum ground projection corresponds to the area of interest.

As the tilt angle θ becomes smaller, the distance 242 will progressively become larger and larger compared to the distance 241.

FIG. 4 is a diagrammatical representation of a directional antenna 100 positioned above the earth's surface at a tilt angle $\theta_3$ 305 where $\theta_3$ 305 approaches the value of half the beam width Φ. The projection 320 of the −3 dB far projection, at pitch angle ($\theta_3$−Φ), approaches a horizontal path and hence the distance on the ground 342 between the maximum gain projection 310 and the −3 dB far projection 320 becomes extremely large and, in the case that $\theta_3$=Φ, infinite. Hence, as the tilt angle value θ approaches the value of half the beam width, Φ, the projection of the antenna coverage on the ground becomes extremely long and impractical. However, the distance on the ground 341 between the maximum gain projection 310 and the −3 dB near projection 330 at angle ($\theta_3$+Φ) is practical and useful. Point 345 represents the antenna maximum ground projection spot. The practice of pointing at the ground area of interest using the antenna maximum projection does not, in fact, correspond to the point on the ground that represents the maximum signal strength. In the example represented in FIG. 4, the range of the maximum antenna gain projection 310 is about twice as far as the range of the −3 dB near antenna projection 330. Assuming free space propagation between the air and the ground, this results in the propagation loss at point 345 being 6 dB higher for the antenna maximum gain projection 310 than the −3 dB near antenna projection 330. Hence, in this case, the −3 dB near antenna projection 330 represents a 3 dB higher effective gain than the maximum antenna gain projection 310 on the ground. As the tilt angle θ becomes progressively smaller, the distance of the maximum antenna gain projection from the antenna to the ground becomes even longer compared to the −3 dB near projection and hence the relative propagation loss increases.

Therefore, using the maximum antenna gain projection to point the antenna at the ground area of interest does not represent the effective highest gain. Also, simply using the two −3 dB antenna gain projections to display the antenna ground coverage can result in extremely large footprints on the ground as the value of the pitch angle approaches that of half the beam width. Such projections have little if no real value.

SUMMARY

Some embodiments include methods and a computer for pointing a beam of a directional antenna located above the ground, such as on an aircraft. In some embodiments, the projection of the maximum effective gain of an airborne directional antenna is determined and the ground projection of the airborne directional antenna coverage is then calculated such that the ground projection corresponds to the true −3 dB effective ground antenna gains, taking into account the various pitch angles of the airborne antenna and the various values for antenna beam width.

According to one aspect, a method for pointing a beam of a directional antenna located above ground, the beam being projected downward toward the ground is provided. The method includes receiving a beam width 2ϕ. An angle $\psi_{max}$ is determined such that $\psi_{max}$+θ is an angle for a projection of maximum signal strength on the ground, $\psi_{max}$ being based on the beam width $2\phi$ and tilt angle $\theta$. The method also includes determining an effective ground beam width defined by a total relative gain of the directional antenna and the above the ground to ground range being at half the maximum signal strength on the ground at angles above and below $\psi_{max}$. The method further includes determining a ground footprint of the beam of the directional antenna based at least on part on the determined effective ground beam width. The method also includes causing the antenna to be pointed based at least in part on the determined ground footprint of the beam of the directional antenna.

According to this aspect, in some embodiments, $\psi_{max}$ is determined from an arctangent of a root of a quadratic equation in terms of the tilt angle $\theta$ and a value N that is based on the beam width $2\phi$ according to the equation, N=Log (0.5)/Log (cos $\phi$). In some embodiments, the maximum signal strength is determined based at least in part on a derivative of a relative total gain equation. In some embodiments, the method further includes determining the tilt angle to be an angle for which a maximum signal strength is directed toward a selected point. In some embodiments, the tilt angle is determined from a look up table. In some embodiments, values in the lookup table are determined as follows:

$$\theta' = \rho - \mathrm{ATAN}[2/(N \tan \rho)],$$

where $\rho$ is a pointing angle to the selected point. In some embodiments, −3 dB near and far projection angles of the beam are determined by a linear function of one half the beam width $2\phi$ and the tilt angle $\theta$.

According to yet another aspect, a method is provided which includes determining a tilt angle $\theta$, the tilt angle $\theta$ being determined to be an angle for which a maximum signal strength on the ground is directed toward a selected point. The method also includes receiving a beam width $2\phi$. The method further includes determining an angle $\psi_{max}$ such that $\psi_{max}+\theta$ is an angle for a projection of maximum signal strength on the ground, $\psi_{max}$ being based on the beam width $2\phi$ and the tilt angle $\theta$. An effective ground beam width is determined as defined by a total relative gain of the directional antenna and the above the ground to ground range being at half the maximum signal strength on the ground at angles above and below $\psi_{max}$. The method also includes determining a ground footprint of the beam of the directional antenna based on the determined effective ground beam width, and causing the antenna to be pointed based at least in part on the determined ground footprint of the beam of the directional antenna.

According to this aspect, in some embodiments, $\psi_{max}$ is determined from an arctangent of a root of a quadratic equation in terms of the tilt angle $\theta$ and a value N that is based on the beam width $2\phi$ according to the equation, N=Log (0.5)/Log (cos $\phi$). In some embodiments, $\psi_{max}$ is determined as:

$$\psi\max = \mathrm{ATAN} \frac{(N+2)\tan\theta - \sqrt{(2+N)^2\tan^2\theta + 8N}}{-2N}$$

In some embodiments, the tilt angle $\theta$ is determined as: $\theta=\rho-\mathrm{ATAN}[2/(N \tan \rho)]$. where $\rho$ is a pointing angle to the selected point. In some embodiments, the maximum signal strength is determined based on a derivative of a relative total gain equation. In some embodiments, the tilt angle is an angle for which a maximum signal strength is directed toward a selected point.

According to another aspect, a computer is provided for pointing a beam of a directional antenna located above ground, where the computer is programmed to perform one or more of the above-described methods.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 14 is a flowchart of an exemplary method for pointing a beam of a directional antenna.

DETAILED DESCRIPTION

This disclosure relates to methods and arrangements for the pointing and ground projection of an airborne directional antenna.

In one embodiment, a method is disclosed where the projection of the maximum effective gain of an airborne directional antenna is determined and the ground projection of the airborne directional antenna coverage is then calculated such that the ground projection corresponds to the true −3 dB effective ground antenna gains taking into account the various tilt angles of the airborne antenna and the various values for antenna beam width.

The propagation of the wireless signals to and from the directional antenna 100 can be assumed to be free space and as such the propagation loss is proportional to the square of the distance, or 6 dB per octave. Hence, doubling the distance results in a 6 dB loss, and multiplying the distance by the square root of 2 results in a 3 dB loss. In addition to the varying distance to the ground across the beam width of the antenna, the antenna gain varies across its beam width. To determine the true maximum gain projection these two gain criteria should be taken into account.

Figure 1:
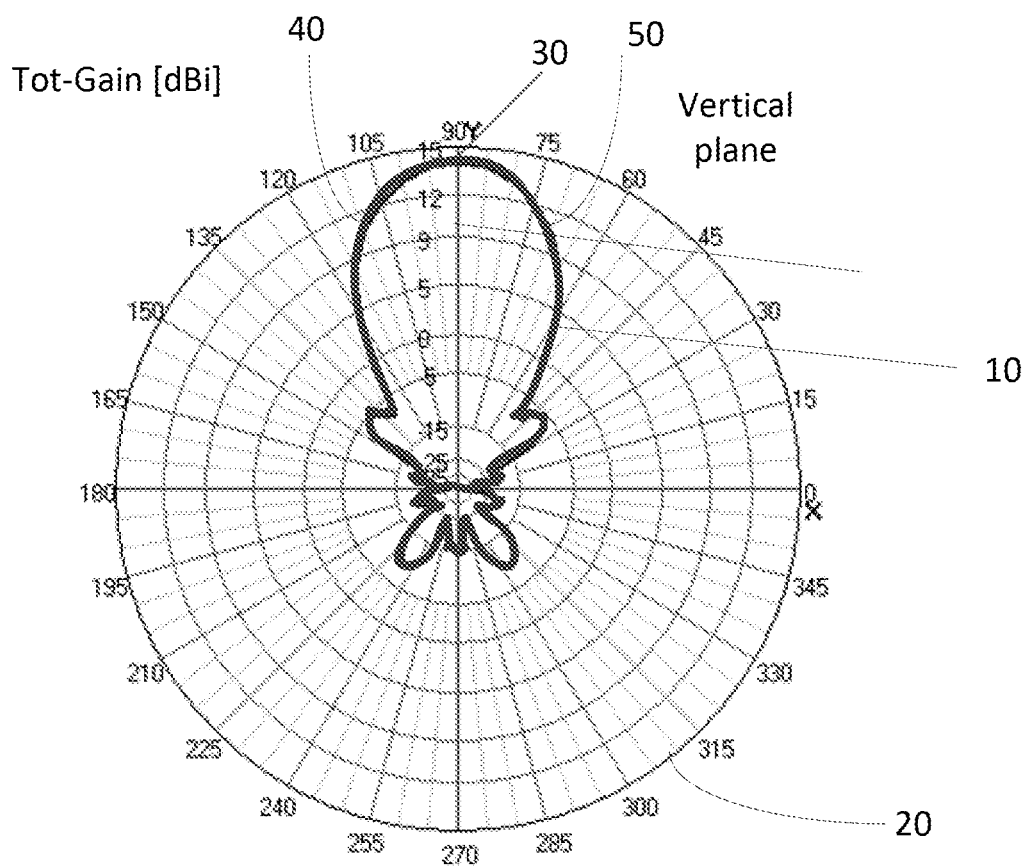
FIG. 1 is an exemplar plot of the gain of a typical directional antenna.
Figure 2:
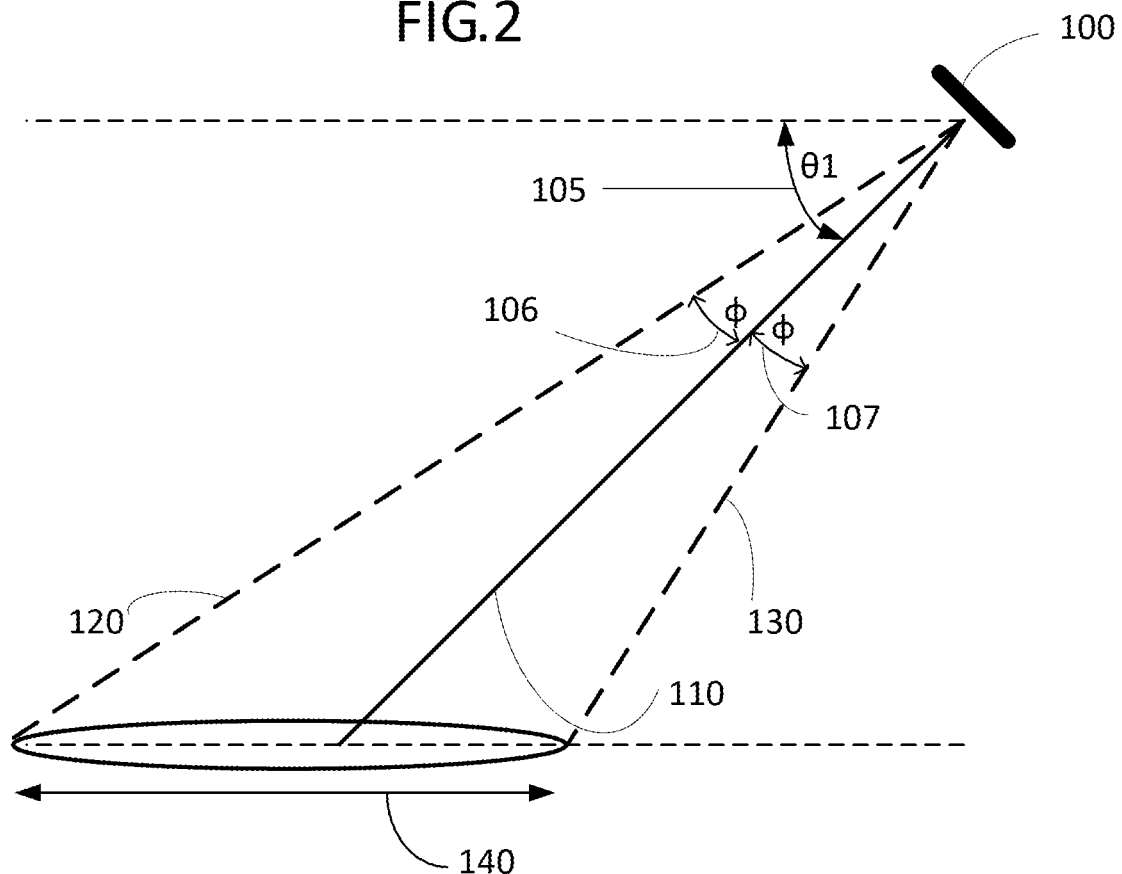
FIG. 2 is a diagrammatical representation of a directional antenna positioned above the earth's surface showing the effective antenna projection on the earth's surface.
Figure 3:
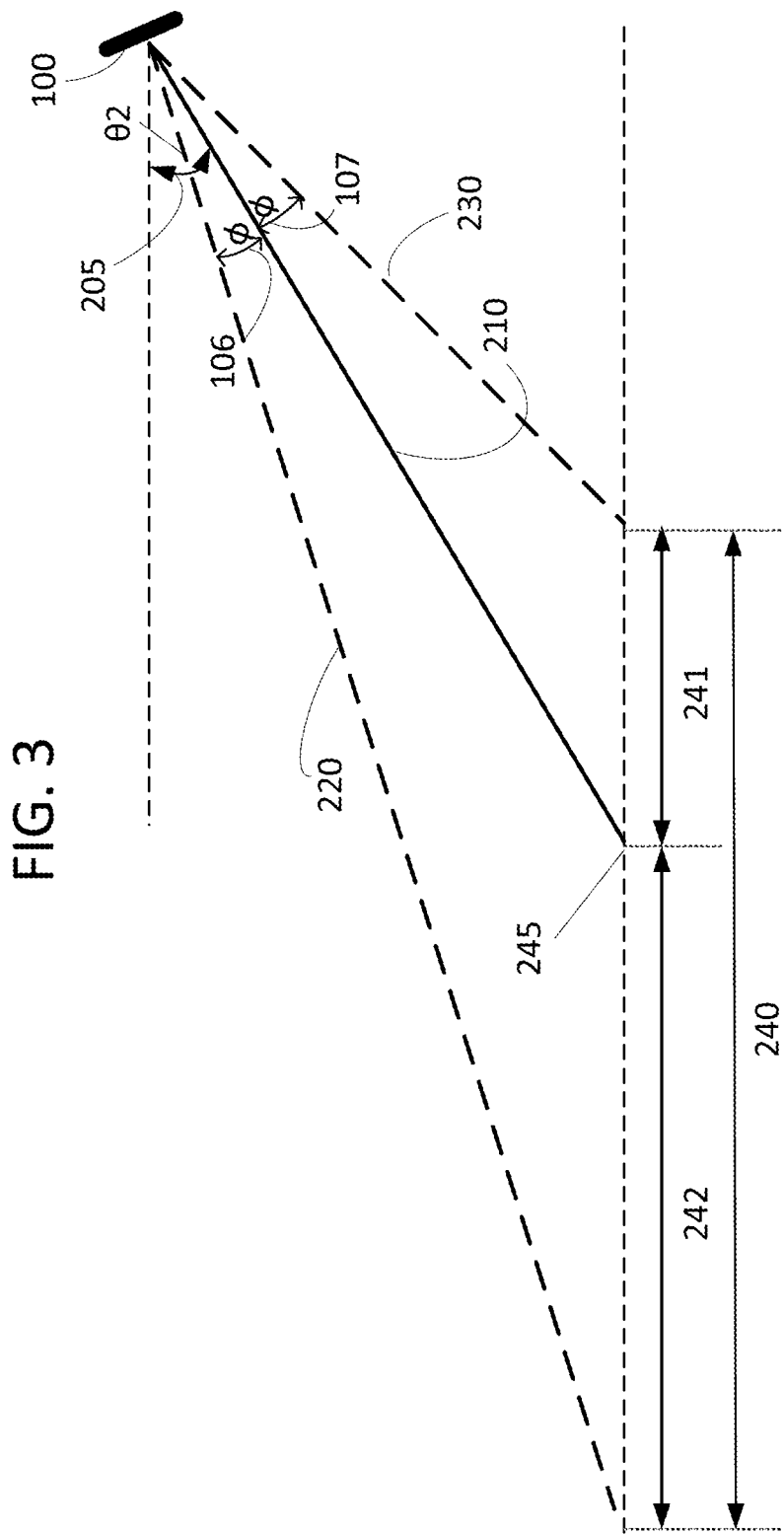
FIG. 3 is a diagrammatical representation of a directional antenna positioned above the earth's surface at a smaller pitch angle than shown in FIG. 1.
Figure 4:
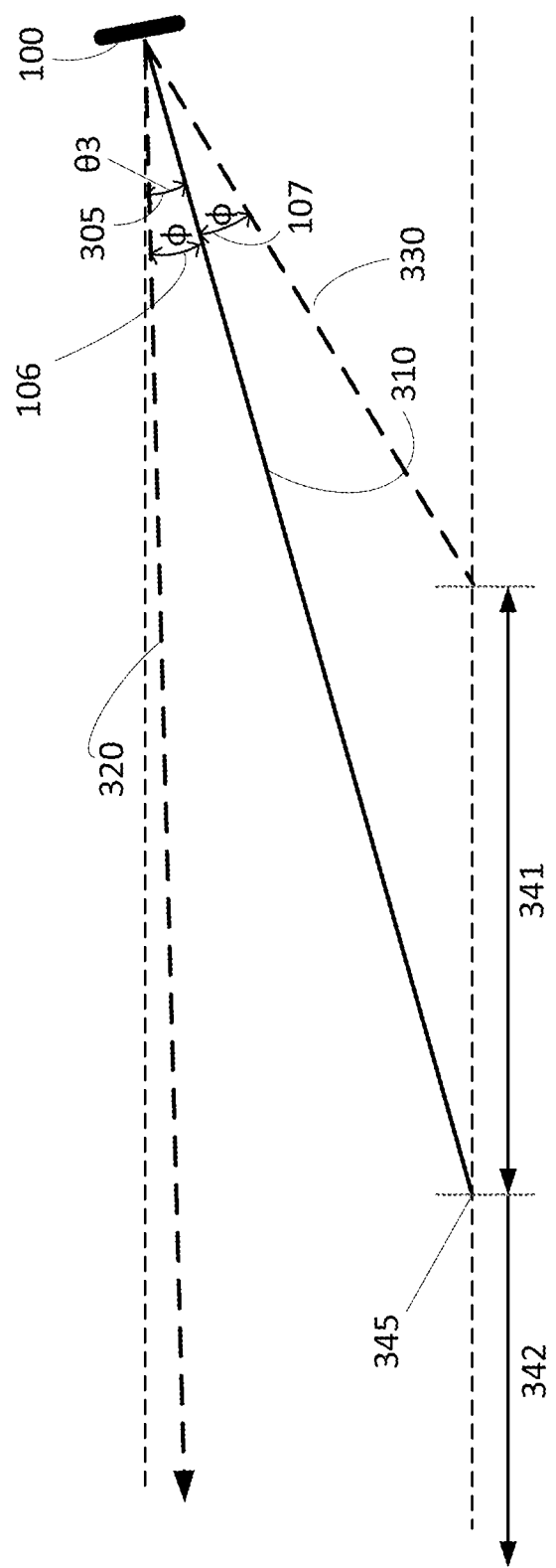
FIG. 4 is a diagrammatical representation of a directional antenna positioned above the earth's surface at a pitch angle that approaches the value of half the beam width.
Figure 5:
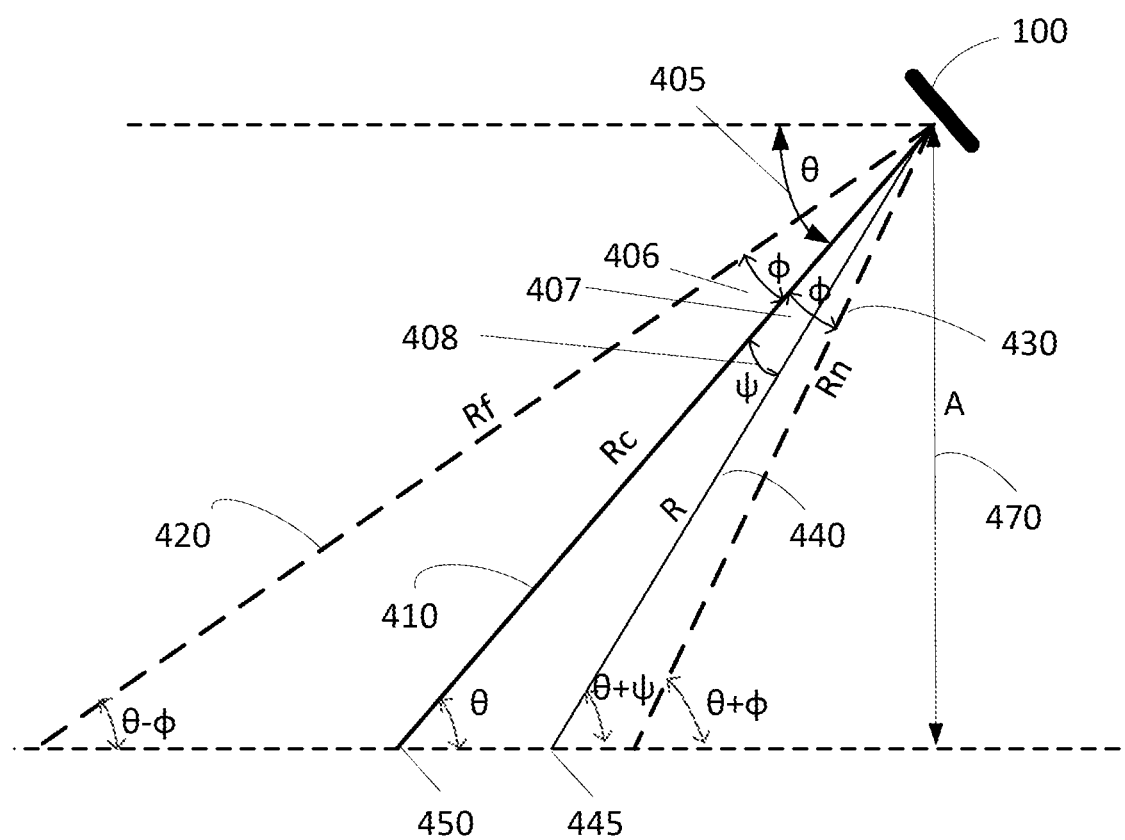
FIG. 5 is a diagrammatical representation of a directional antenna positioned at an altitude A above the earth's surface at a tilt angle $\theta$.

Referring again to the drawing figures, FIG. 5 is a diagrammatical representation of a directional antenna 100 positioned at an altitude A 470 above the earth's surface at a tilt angle θ 405. Directional antenna 100 has a 3 dB beam width of 2Φ, 406 and 407. Rn is the distance from the directional antenna 100 to the ground of the −3 dB antenna gain near projection 430, Rc is the distance from the directional antenna 100 to the ground of the maximum antenna gain projection 410 and Rf is the distance from the directional antenna 100 to the ground of the −3 dB antenna gain far projection 420. R is the distance from the directional antenna 100 to the ground of an antenna projection range 440 that is at an angle of ψ 408, such that the pitch angle of the projection range 440 is (θ+ψ). Antenna projection range 440 is directed at position 445 on the ground. At position 445 the effective signal gain will be dependent upon:

a) The propagation loss due to distance R, and
b) The antenna relative loss due to the angle ψ.

Figure 6:
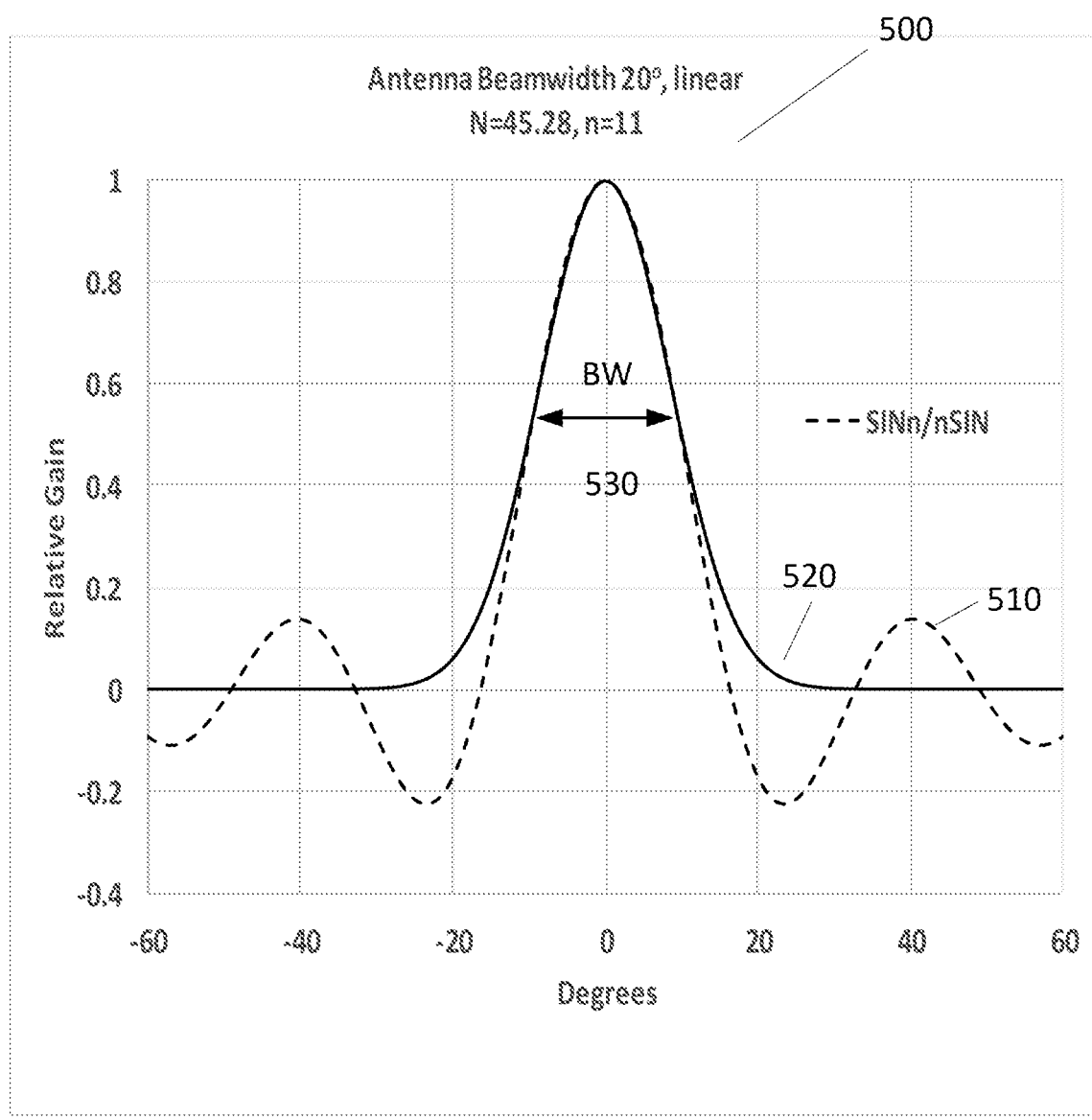
FIG. 6 is a graphical representation of the gain of a directional antenna with a beam width of 20 degrees.

FIG. 6 is a graphical representation 500 of the gain of a directional antenna with a beam width of 20 degrees. The classical method to represent the relative gain of a directional antenna with angle, based upon the number of elements in the array, is the following equation:

$$\text{AntGain} = \sin(nx)/n\sin(x) \quad (1)$$

where n is the number of elements and x is the angle from the center or boresight, where x=0 at the boresight of the antenna.

In FIG. 6, the relative antenna gain 510 is the result of using equation (1) with n=11. At the boresight, x=0, the relative gain is unity. The beam width 530 is 20 degrees (±10°). In a practical antenna with beam width 20 degrees, the gain at the boresight would be in the order of 18 dB but it is the relative gain with angle that is of interest here. The solving of equation (1) for any particular beam width can be expressed in terms of Euler's equation and binomial coefficients but, in order to simplify the calculations, it is common to use an approximation of De Moivre's theorem, as per the following equation:

$$\text{AntGain} = \cos^N(x) \quad (2)$$

where x is the angle from the center or boresight, and N can be calculated for any given beam width.

Using equation (2), at boresight x=0 and AntGain=1. The beam width, therefore, at angles ±Φ is determined when Gain=0.5, hence $$\cos^N \Phi = 0.5$$

Or $N \log(\cos \Phi) = \log(0.5)$ $$N = \log(0.5)/\log(\cos \Phi) \quad (3)$$

where the antenna beam width is 2Φ. For a beam width of ±20 degrees, Φ=10 and N calculates to be 45.28. In FIG. 6 the relative antenna gain curve 520, is based upon equation (3). An examination of the relative gain curves 510 and 520 show that the use of equation (2) in place of equation (1) is a reasonable approximation.

Table 1 shows the values for N for half beam widths, Φ, varying from 10 to 45 degrees.

TABLE 1

| BW/2, Φ | N |
| --- | --- |
| 10 | 45.28 |
| 15 | 19.99 |
| 20 | 11.14 |
| 25 | 7.05 |
| 30 | 4.82 |
| 35 | 3.47 |
| 40 | 2.60 |
| 45 | 2.00 |

Referring again to FIG. 5, using standard trigonometry, the value of the projection range R 440 is $$R = A/\sin(\theta + \psi)$$

Assuming free space propagation, the distance loss is proportional to the distance squared: hence the relative distance loss, Ld, due to the range R 440 can be related to the distance loss due to the distance A 470

$$Ld = (A \sin(\theta + \psi)/A)^2$$

Hence, $Ld = \sin^2(\theta + \psi)$ \quad (4)

The relative loss due to the antenna beam width is given by equation (2). Hence, as the angle ψ is varied, the relative total gain, Gt, is the product of equations (2) and (4)

$$Gt = \sin^2(\theta + \psi)\cos^N(\psi) \quad (5)$$

Figure 7:
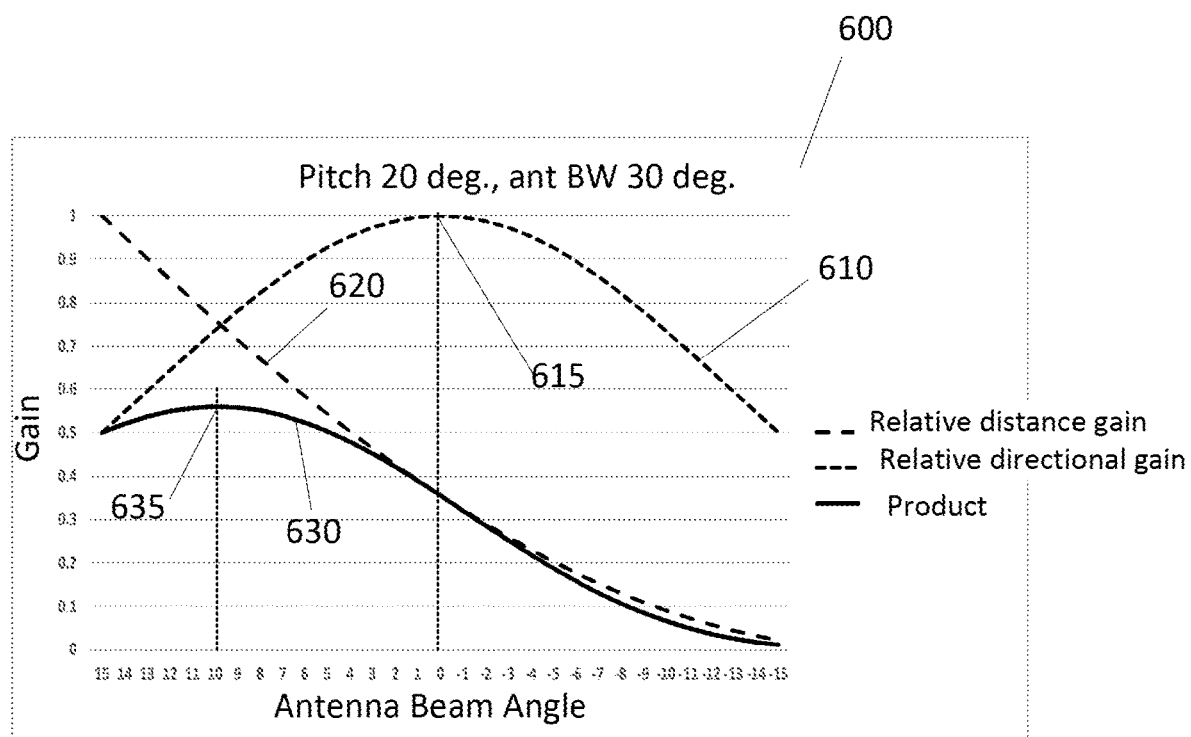
FIG. 7 is a graphical representation of the results of applying equation (5) for an antenna with a beam width $2\Phi$ of 30 degrees, positioned with a tilt angle $\theta$ of 20 degrees as the angle $\psi$ is varied across the beam width from 15 to −15 degrees.

FIG. 7 is a graphical representation 600 of the results of applying equation (5) for a directional antenna 100 with a beam width 2Φ (406 and 407) of 30 degrees, positioned with a tilt angle θ 405 of 20 degrees as the angle ψ 408 is varied across the beam width from 15 to −15 degrees. Curve 610 is the relative gain of the antenna (equation (2)), curve 620 is the relative gain due to propagation distance loss (equation (4)) and curve 630 is the total relative gain (equation (5). By observation of the total relative gain curve 630, it can be seen that this reaches a maximum 635 when ψ is about 10 degrees whereas the antenna gain curve 610 reaches a maximum 615 at 0 degrees. Hence, referring to FIG. 5, assuming that θ (405)=20, Φ (407)=15 and ψ (408)=10, position 445 would represent the projection on the ground of maximum signal strength, rather than point 450 which is the projection of the maximum antenna gain.

Figure 8:
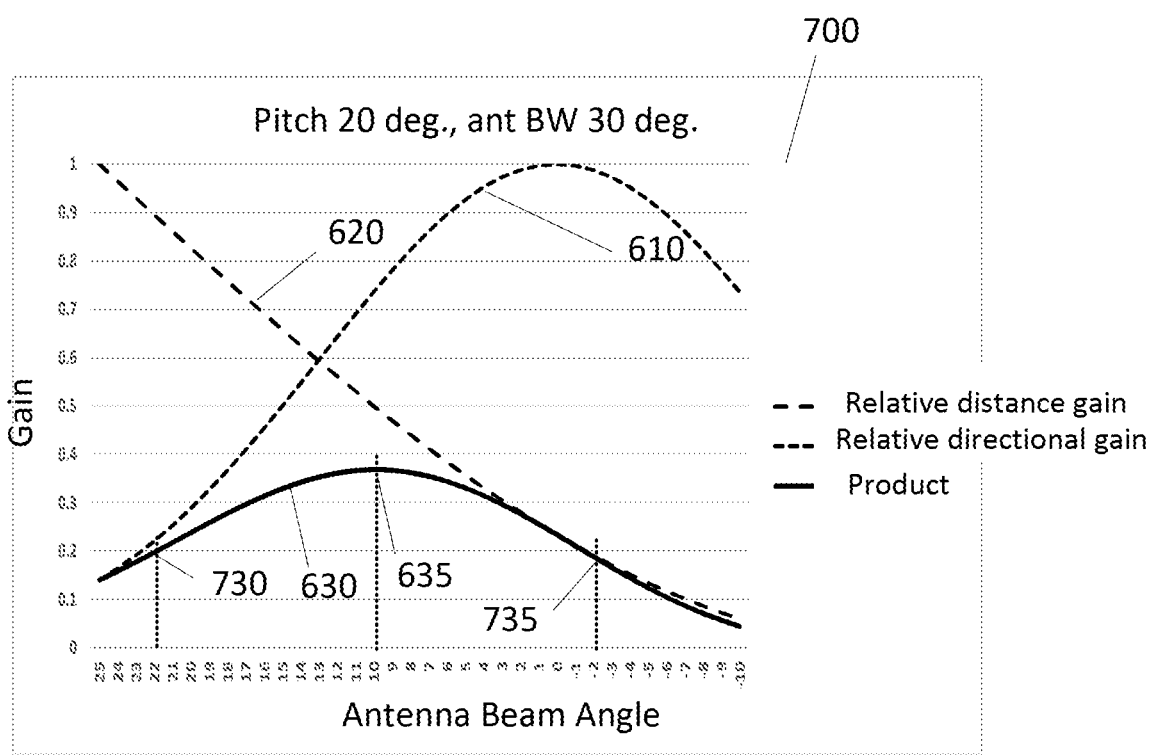
FIG. 8 is a graphical representation of the results of applying equation (5) for an antenna with a beam width $2\Phi$ of 30 degrees, positioned with a tilt angle $\theta$ of 20 degrees as the angle $\psi$ is varied from 25 to −10 degrees.

FIG. 8 is a graphical representation 700 of the results of applying equation (5) for a directional antenna 100 with a beam width 2Φ (406 and 407) of 30 degrees, positioned with a tilt angle θ 405 of 20 degrees as the angle ψ 408 is varied from 25 to −10 degrees. Curve 610 is the relative gain of the antenna (equation (2)), curve 620 is the relative gain due to propagation distance loss (equation (4)) and curve 630 is the total relative gain (equation (5)) which reaches a maximum 635 when ψ is about 10 degrees. The total relative gain curve 630 is at half the maximum value (−3 dB) when ψ is about 22 degrees 730 and −2 degrees 735, thereby providing an effective ground beam width of about 24 degrees. The directional antenna 100 in this example has a beam width of 30 degrees, the −3 dB angles for the relative antenna gain curve 610 being 15 and −15 degrees. Thus, in this example the true effective ground 3 dB beam width is 24 degrees, not 30 degrees.

Therefore, as demonstrated in FIGS. 7 and 8, for a directional antenna 100 pitched at a tilt angle θ 405, the true maximum gain projection on the ground generally does not correspond to the maximum gain of the antenna. The −3 dB relative gain projections also do not correspond to the −3 dB beam width of the directional antenna 100. For the optimum results, it should be clear to one of ordinary skilled in the art, that in the case where there is a particular area of interest on the ground, the directional antenna 100 should be tilted such that the direction of maximum signal strength is pointing at that area.

The maximum value for the maximum total gain, Gt, can be derived by taking the first derivative of equation (5):

$$\frac{d\,Gt}{d\psi} = \sin^2(\theta+\psi)\frac{d}{d\psi}(\cos^N\psi) + \cos^N\psi\frac{d}{d\psi}(\sin^2(\theta+\psi)) \quad (6)$$

$$\frac{d}{d\psi}(\cos^N\psi) = -N\cos^{N-1}\psi\,\sin\psi$$

$$\frac{d}{d\psi}(\sin^2(\theta+\psi)) = 2\sin(\theta+\psi)\cos(\theta+\psi)$$

Hence, $$\frac{d\,Gt}{d\psi} = -\sin^2(\theta+\psi)N\cos^{N-1}\psi\,\sin\psi + 2\cos^N\psi\,\sin(\theta+\psi)\cos(\theta+\psi)$$

For maximum Gt, $$\frac{d\,Gt}{d\psi} = 0 \text{ i.e.,} \quad (7)$$

$$\sin(\theta+\psi)\cos^{N-1}\psi\,[-N\sin(\theta+\psi)\sin\psi + 2\cos\psi\cos(\theta+\psi)] = 0$$

(7) reduces to $-N\tan(\theta+\psi)\tan\psi + 2 = 0$ (8)

Expanding tan(θ+ψ) and rearranging results in the following quadratic equation:

$-N\tan^2\psi - (2+N)\tan\theta\,\tan\psi + 2 = 0$ (9)

Hence for maximum Gt $$\tan\psi\text{max} = \frac{(N+2)\tan\theta - \sqrt{(2+N)^2\tan^2\theta + 8N}}{-2N} \quad (10)$$

And $$\psi\text{max} = \text{ATAN}\frac{(N+2)\tan\theta - \sqrt{(2+N)^2\tan^2\theta + 8N}}{-2N}$$

Table 2 provides examples of the calculated values for the angle $\psi_{max}$, for various tilt angles θ and antenna half beam widths Φ, for the projection that corresponds to the total maximum ground gain, using equation (10).

TABLE 2

| BW/ | Angle ψmax, Tilt angle, θ | | | | | | | | |
|---|---|---|---|---|---|---|---|---|---|
| 2, Φ | 10 | 20 | 30 | 40 | 50 | 60 | 70 | 80 | 90 |
| 10 | 7.8 | 5.3 | 3.8 | 2.7 | 2.0 | 1.4 | 0.9 | 0.4 | 0.0 |
| 15 | 13.2 | 9.9 | 7.4 | 5.6 | 4.1 | 2.9 | 1.9 | 0.9 | 0.0 |
| 20 | 18.4 | 14.6 | 11.5 | 8.9 | 6.7 | 4.8 | 3.1 | 1.5 | 0.0 |
| 25 | 23.3 | 19.2 | 15.6 | 12.4 | 9.5 | 6.9 | 4.5 | 2.2 | 0.0 |
| 30 | 28.0 | 23.6 | 19.5 | 15.8 | 12.3 | 9.0 | 5.9 | 2.9 | 0.0 |
| 35 | 32.3 | 27.7 | 23.3 | 19.0 | 15.0 | 11.1 | 7.4 | 3.7 | 0.0 |

TABLE 2-continued

| BW/ | Angle ψmax, Tilt angle, θ | | | | | | | | |
|---|---|---|---|---|---|---|---|---|---|
| 2, Φ | 10 | 20 | 30 | 40 | 50 | 60 | 70 | 80 | 90 |
| 40 | 36.3 | 31.5 | 26.8 | 22.1 | 17.6 | 13.1 | 8.7 | 4.4 | 0.0 |
| 45 | 40.0 | 35.0 | 30.0 | 25.0 | 20.0 | 15.0 | 10.0 | 5.0 | 0.0 |

Referring again to FIG. 5, the maximum gain projection range 440, is at an angle of (θ+ψ) referenced to the horizontal. Table 3 shows examples of the actual pitch angle, (θ+ψ) of the projection of maximum antenna gain.

TABLE 3

| BW/ | Projection angle max gain (θ + ψmax) Tilt angle, θ | | | | | | | | |
|---|---|---|---|---|---|---|---|---|---|
| 2, Φ | 10 | 20 | 30 | 40 | 50 | 60 | 70 | 80 | 90 |
| 10 | 17.8 | 25.3 | 33.8 | 42.7 | 52.0 | 61.4 | 70.9 | 80.4 | 90.0 |
| 15 | 23.2 | 29.9 | 37.4 | 45.6 | 54.1 | 62.9 | 71.9 | 80.9 | 90.0 |
| 20 | 28.4 | 34.6 | 41.5 | 48.9 | 56.7 | 64.8 | 73.1 | 81.5 | 90.0 |
| 25 | 33.3 | 39.2 | 45.6 | 52.4 | 59.5 | 66.9 | 74.5 | 82.2 | 90.0 |
| 30 | 38.0 | 43.6 | 49.5 | 55.8 | 62.3 | 69.0 | 75.9 | 82.9 | 90.0 |
| 35 | 42.3 | 47.7 | 53.3 | 59.0 | 65.0 | 71.1 | 77.4 | 83.7 | 90.0 |
| 40 | 46.3 | 51.5 | 56.8 | 62.1 | 67.6 | 73.1 | 78.7 | 84.4 | 90.0 |
| 45 | 50.0 | 55.0 | 60.0 | 65.0 | 70.0 | 75.0 | 80.0 | 85.0 | 90.0 |

Equation (10) and Tables 2 and 3 enable the angle of the maximum gain projection to be calculated for any given antenna tilt angle θ and antenna beam width 2Φ. However, in the case that the directional antenna 100 is to be pointed at a particular point of interest on the ground, it is more practical to know the antenna tilt angle required for that particular maximum antenna gain projection. In this case, equation (8) is solved for θ, as follows:

$-N\tan(\theta+\psi\text{ max})\tan\psi\text{ max} + 2 = 0$ (8)

Let ρ be the pointing angle (θ+ψ max), therefore ψ max=ρ−θ

Hence (8) becomes $-N\tan(\rho)\tan(\rho-\theta)+2=0$ $\tan(\rho-\theta)=2/(N\tan\rho)$ Thus, $\theta=\rho-\text{ATAN}[2/(N\tan\rho)]$ (11)

Table 4 provides examples of the calculated values, using equation (11), for the target antenna tilt angle θ corresponding to the desired pointing angle ρ, for half beam widths Φ varying from 10 to 45 degrees.

TABLE 4

| BW/ | Target Tilt angle, θ Pointing angle, ρ | | | | | | | | |
|---|---|---|---|---|---|---|---|---|---|
| 2, Φ | 10 | 20 | 30 | 40 | 50 | 60 | 70 | 80 | 90 |
| 10 | 0 | 13 | 26 | 37 | 48 | 59 | 69 | 80 | 90 |
| 15 | 0 | 5 | 20 | 33 | 45 | 57 | 68 | 79 | 90 |
| 20 | 0 | 0 | 13 | 28 | 41 | 54 | 66 | 78 | 90 |
| 25 | 0 | 0 | 4 | 21 | 37 | 51 | 64 | 77 | 90 |
| 30 | 0 | 0 | 0 | 14 | 31 | 47 | 61 | 76 | 90 |
| 35 | 0 | 0 | 0 | 6 | 24 | 42 | 58 | 74 | 90 |
| 40 | 0 | 0 | 0 | 0 | 17 | 36 | 54 | 72 | 90 |
| 45 | 0 | 0 | 0 | 0 | 10 | 30 | 50 | 70 | 90 |

Note that if the solution for equation (11) is negative, then the target antenna tilt angle θ is set to zero degrees in order to have the projection towards the ground.

Having determined the antenna pitch angle required for the desired maximum signal strength projection angle to be pointed at the desired spot on the ground, the −3 dB gain projections can now be determined. Equation (5) is the relative value of the total gain, Gt.

$$Gt = \sin^2(\theta+\psi)\cos^N(\psi) \quad (5)$$

The maximum value of Gt is given by, $$Gt\ max = \sin^2(\theta+\psi\ max)\cos^N(\psi\ max)$$

Hence, the −3 dB gain projections will be for two values of the pointing angle ρ, where $$Gt = Gt\ max/2$$

Hence, $Gt_{-3} = \sin^2(\theta+\psi\ max)\cos^N(\psi\ max)/2$ $$\frac{Gt_{-3}}{Gt} = (\sin^2(\theta+\psi)\cos^N(\psi))/(\sin^2(\theta+\psi max)\cos^N(\psi max)) = 0.5 \quad (12)$$

Equation (12) cannot easily be solved for the projection angles (θ+ψ) for the −3 dB far projection and the −3 dB near projection, but the values can be determined by an iterative process. Tables 5 and 6 show the results of calculating the −3 dB near and far projection angles respectively.

TABLE 5

| BW/ | −3 dB Far Projection Angle Tilt angle, θ | | | | | | | | |
|---|---|---|---|---|---|---|---|---|---|
| 2, Φ | 10 | 20 | 30 | 40 | 50 | 60 | 70 | 80 | 90 |
| 10 | 10 | 17 | 25 | 33 | 42 | 52 | 61 | 71 | 80 |
| 15 | 12 | 18 | 24 | 32 | 40 | 49 | 58 | 67 | 76 |
| 20 | 15 | 20 | 25 | 32 | 39 | 47 | 55 | 63 | 72 |
| 25 | 17 | 21 | 26 | 32 | 39 | 45 | 53 | 60 | 68 |
| 30 | 19 | 23 | 28 | 33 | 38 | 44 | 51 | 58 | 65 |
| 35 | 22 | 25 | 29 | 34 | 39 | 44 | 50 | 56 | 62 |
| 40 | 24 | 27 | 31 | 35 | 39 | 44 | 49 | 54 | 59 |
| 45 | 26 | 29 | 32 | 36 | 39 | 43 | 48 | 52 | 57 |

TABLE 6

| BW/ | −3 dB Near Projection Angle Tilt angle, θ | | | | | | | | |
|---|---|---|---|---|---|---|---|---|---|
| 2, Φ | 10 | 20 | 30 | 40 | 50 | 60 | 70 | 80 | 90 |
| 10 | 26 | 35 | 43 | 52 | 62 | 71 | 81 | 90 | 100 |
| 15 | 35 | 43 | 51 | 59 | 68 | 77 | 86 | 95 | 104 |
| 20 | 44 | 51 | 58 | 66 | 75 | 83 | 92 | 100 | 109 |
| 25 | 51 | 58 | 65 | 73 | 81 | 89 | 97 | 104 | 112 |
| 30 | 58 | 65 | 72 | 79 | 86 | 94 | 101 | 108 | 115 |
| 35 | 64 | 71 | 78 | 85 | 92 | 99 | 105 | 112 | 118 |
| 40 | 70 | 77 | 83 | 90 | 96 | 103 | 109 | 115 | 121 |
| 45 | 75 | 81 | 88 | 94 | 101 | 107 | 112 | 118 | 123 |

Figure 9:
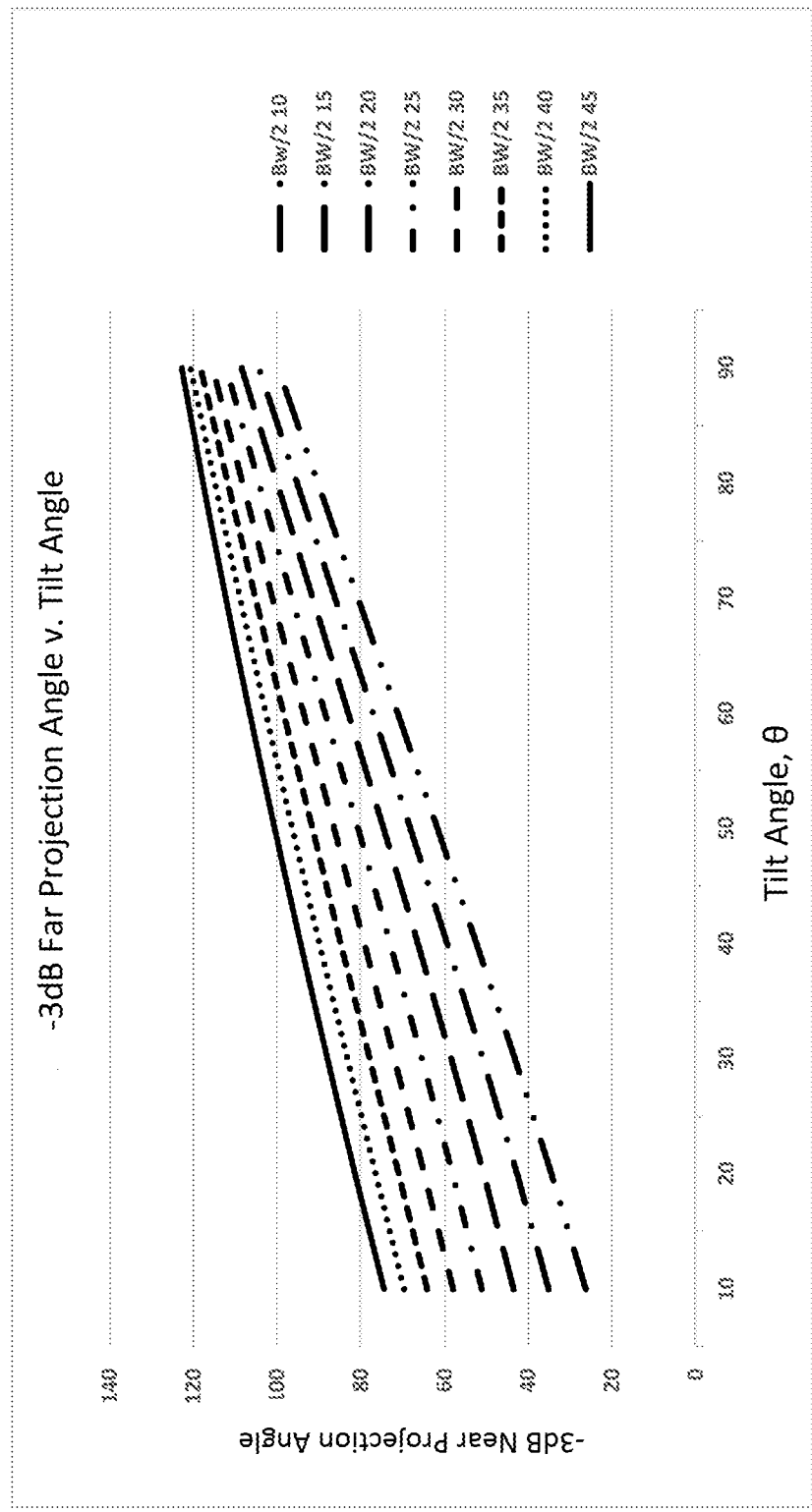
FIG. 9 and FIG. 10 are graphical representations of the −3 dB near projection angle and −3 dB far projection angles as per Tables 5 and 6, respectively.
Figure 10:
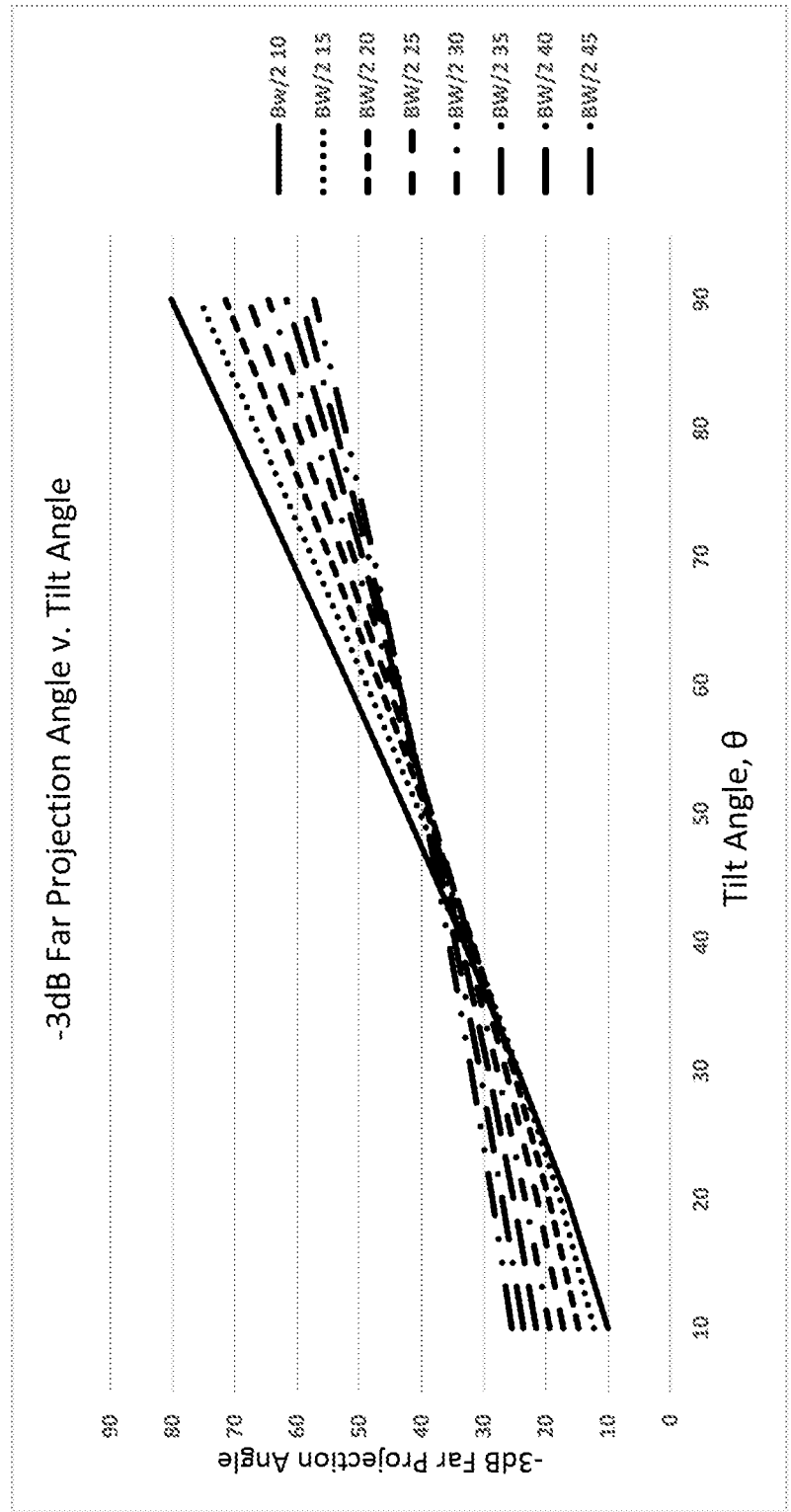

FIG. 9 and FIG. 10 are graphical representations of the −3 dB near projection angle and −3 dB far projection angles versus tilt angle θ, as per Tables 5 and 6 respectively. Observation of these graphs reveals that the results are approximately linear. The following equations have been derived by linear approximation of the results given in Tables 5 and 6.

−3 dB Far Projection angle=(−0.01Φ+1.03)θ+ 0.67Φ−8   (13)

−3 dB Near Projection angle=(−0.01Φ+1.02)θ+ 1.54Φ+2   (14)

The errors that result in using the equations (13) and (14), compared to the results in Tables 5 and 6, are shown in Tables 7 and 8 respectively.

TABLE 7

| BW/ | −3 dB Far Projection Angle error using (13) Tilt angle, θ | | | | | | | | |
|---|---|---|---|---|---|---|---|---|---|
| 2, Φ | 10 | 20 | 30 | 40 | 50 | 60 | 70 | 80 | 90 |
| 10 | −3 | 0 | 1 | 1 | 1 | 0 | −1 | −1 | −2 |
| 15 | −2 | 0 | 2 | 2 | 2 | 2 | 1 | 0 | −1 |
| 20 | −2 | 1 | 2 | 3 | 3 | 3 | 2 | 1 | 0 |
| 25 | −2 | 1 | 2 | 3 | 3 | 3 | 2 | 2 | 0 |
| 30 | −2 | 0 | 2 | 3 | 3 | 3 | 2 | 1 | 0 |
| 35 | −1 | 0 | 2 | 2 | 2 | 2 | 2 | 1 | 0 |
| 40 | −1 | 0 | 1 | 2 | 2 | 2 | 1 | 0 | −1 |
| 45 | 0 | 1 | 1 | 1 | 1 | 1 | 0 | −1 | −2 |

TABLE 8

| BW/ | −3 dB Near Projection error using (14) Tilt angle, θ | | | | | | | | |
|---|---|---|---|---|---|---|---|---|---|
| 2, Φ | 10 | 20 | 30 | 40 | 50 | 60 | 70 | 80 | 90 |
| 10 | 0 | 1 | 2 | 2 | 2 | 2 | 1 | 1 | 1 |
| 15 | −1 | 0 | 1 | 1 | 1 | 1 | 0 | 0 | 0 |
| 20 | −2 | −1 | −1 | 0 | 0 | 0 | −1 | −1 | −1 |
| 25 | −3 | −2 | −1 | −1 | −1 | −1 | −1 | −1 | −1 |
| 30 | −2 | −2 | −2 | −2 | −1 | −1 | −1 | −1 | −1 |
| 35 | −1 | −1 | −1 | −1 | −1 | −1 | −1 | −1 | 0 |
| 40 | 0 | 0 | 0 | −1 | −1 | −1 | 0 | 0 | 1 |
| 45 | 3 | 2 | 1 | 1 | 0 | 0 | 1 | 1 | 2 |

The errors indicated in Tables 7 and 8 represent acceptable values. Hence, equations (13) and (14) may be used to estimate the −3 dB far and near projection angles.

The −3 dB near and far projections may be used to indicate an accurate indication of the effective gain of the antenna on the ground. For any given value of the directional antenna 100 tilt angle θ 405, the −3 dB near and far projections may be determined either by look up tables, Tables 5 and 6, or by equation, (13) and (14). If it is desired to point the directional antenna 100 at a particular point on the ground, then the desired maximum gain projection angle is known. In this case the antenna tilt angle θ 405 may be determined by either a look up table, Table 4, or by equation, (11).

Figure 11:
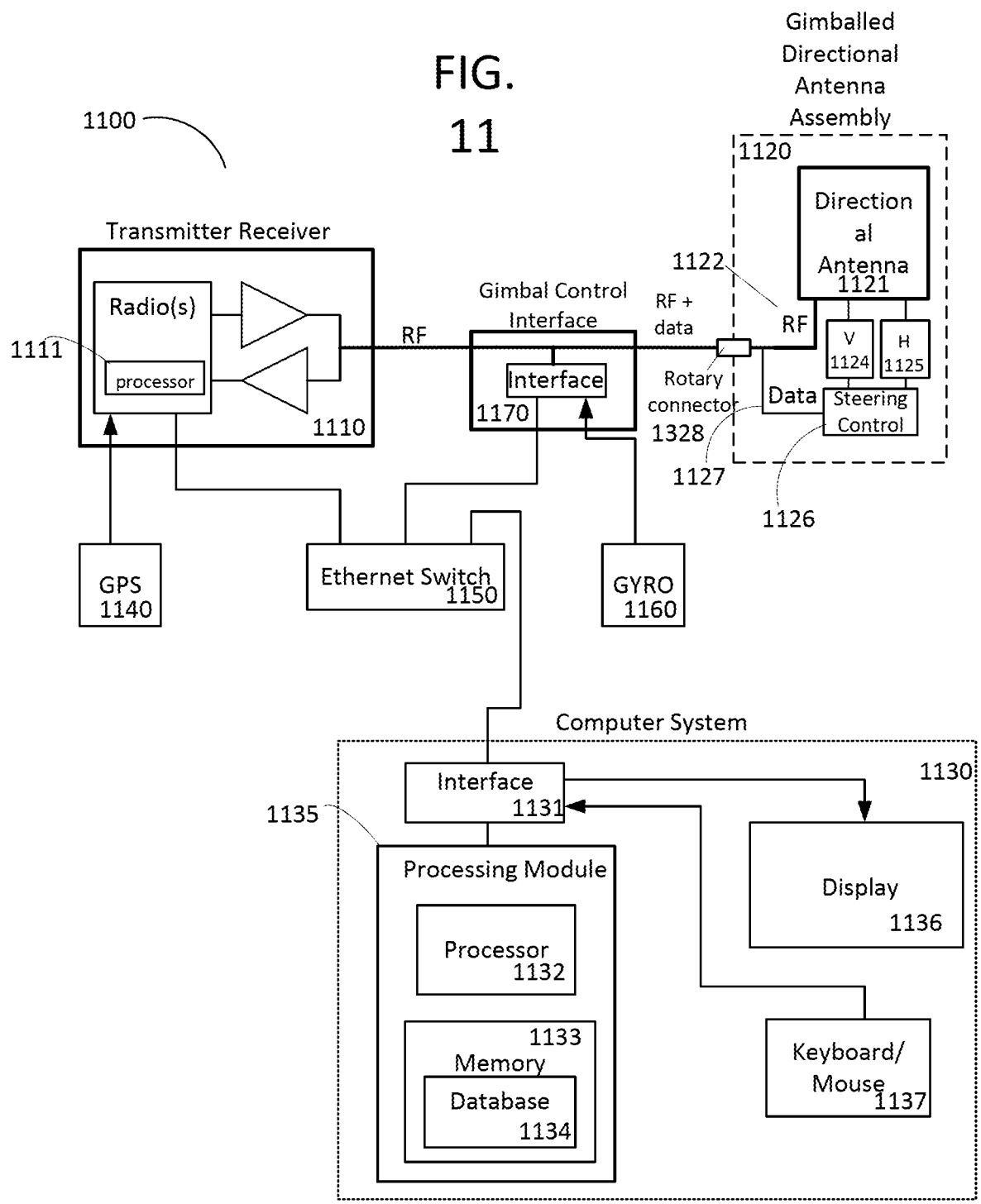
FIG. 11 is a block diagram of an example airborne system employing a gimballed directional antenna that is used in accordance with the principles of the present invention.

FIG. 11 is a block diagram of an example airborne system 1100 employing a gimballed directional antenna 1121 that is used in accordance with the principles described herein. In one embodiment, system 1100 may include a gimballed directional antenna assembly 1121, a transmitter receiver 1110, a gimbal control interface module 1170, a computer system 1130, a global positioning system (GPS) module 1140, a gyro module 1160 and network switch such as an Ethernet switch 1150.

A directional antenna 1121 may be part of the gimballed antenna assembly 1120 which may also include a steering control module 1126 which may operate two motors 1124 and 1125 that control the vertical and horizontal orientations of the directional antenna 1121 respectively. The transmitter receiver 1110 may transmit or receive radio frequency (RF) signals to and from the directional antenna 1121. The RF signal from the transmitter receiver 1110 may be connected to the gimbal control interface module 1170. The gyro module 1160 may provide yaw, pitch and roll information of the airborne platform and the gyro module output may be inputted to the gimbal control interface module 1170. The GPS module 1140 output may be connected to the transmitter receiver 1110. The GPS module 1140 may provide the latitude, longitude and elevation of the airborne platform. The transmitter receiver 1110 may append GPS information to any RF transmission. The network switch 1150 may be connected to the Transmitter Receiver 1110, the computer system 1130 and the gimbal control interface 1170.

The gimbal control interface module may take data via the network switch 1150 and data from the gyro module 1160, and convert the data to a single data stream which is added to the RF signal to or from the transmitter receiver 1110. The combined RF and data stream may then be connected to the gimballed directional antenna assembly 1120 via a rotary connector 1128. The data 1127 may be filtered from the RF signal 1122 and connected to the steering control module 1126 and used to control the vertical and horizontal position of the directional antenna 1121. Information on the tilt angle of the directional antenna 1121 may be fed back to the gimbal control interface module 1170 where the information may be converted into data such as Ethernet and applied to the network switch 1150.

The transmitter receiver 1110 may include a processor 1111. The GPS information may be provided to the processor 1111 by the GPS module 1140. RF receptions may have the GPS information added such that the position of the airborne platform is known for each received signal. The transmitter receiver 1110 may include more than one radio and therefore any transmission may be automatically received by another radio within the transmitter receiver and by this means, the airborne platform position is also known for each transmission. The GPS information may be sent to the network switch 1150 and therefore made available to the computer system 1130.

The computer system 1130 may include an interface 1131. Interface 1131 may contain an Ethernet connection to the network switch 1150, the connection to a display 136, a connection to a keyboard and mouse 1137 as well as interfacing to the processing module 1135. In some embodiments the processing module 1135, i.e., processing circuitry, may include a processor 1132, a memory 1133 and a database 1134. The database 1134 may contain the ground mapping information of the area of interest and the processor 1132 and memory 1133 may be used to carry out the exemplary methods 1200, 1300 and 1400, described below, using information on the position of the airborne platform derived from the GPS module 1140, the gyro module 1160, and beam width information on the directional antenna 1121 which may be inputted using the keyboard and mouse 1137. The tilt angle may be transferred from the network switch 1150 to the interface 1131. The display 1136 may be used to show the ground map together with the directional antenna ground projection which may be derived using the exemplary methods 1200, 1300 and 1400, described below. Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing module 1335 may include the memory 1133 and a processor 1132, the memory 1133 containing instructions which, when executed by the processor 1132, configure the processor 1132 to perform the one or more functions described herein. In addition to a traditional processor and memory, the processing module 1135 may comprise integrated circuitry for processing and/or control, e.g., one or more processors and/or processor cores and/or FPGAs (Field Programmable Gate Array) and/or ASICs (Application Specific Integrated Circuitry).

The processing module 1135 may include processing circuitry and may be connected to and/or be configured for accessing (e.g., writing to and/or reading from) the memory 1133, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1133 may be configured to store code executable by control circuitry and/or other data, e.g., data pertaining to communication, e.g., configuration and/or address data of nodes, etc. The processing module 1135 may be configured to control any of the methods described herein and/or to cause such methods to be performed, e.g., by the processor 1132. Corresponding instructions may be stored in the memory 1133, which may be readable and/or readably connected to the processing module 1135. In other words, the processing module 1135 may include a controller, which may comprise a microprocessor and/or microcontroller and/or FPGA (Field-Programmable Gate Array) device and/or ASIC (Application Specific Integrated Circuit) device. It may be considered that the processing module 1135 includes or may be connected or connectable to memory, which may be configured to be accessible for reading and/or writing by the controller and/or processing module 1135.

Figure 12:
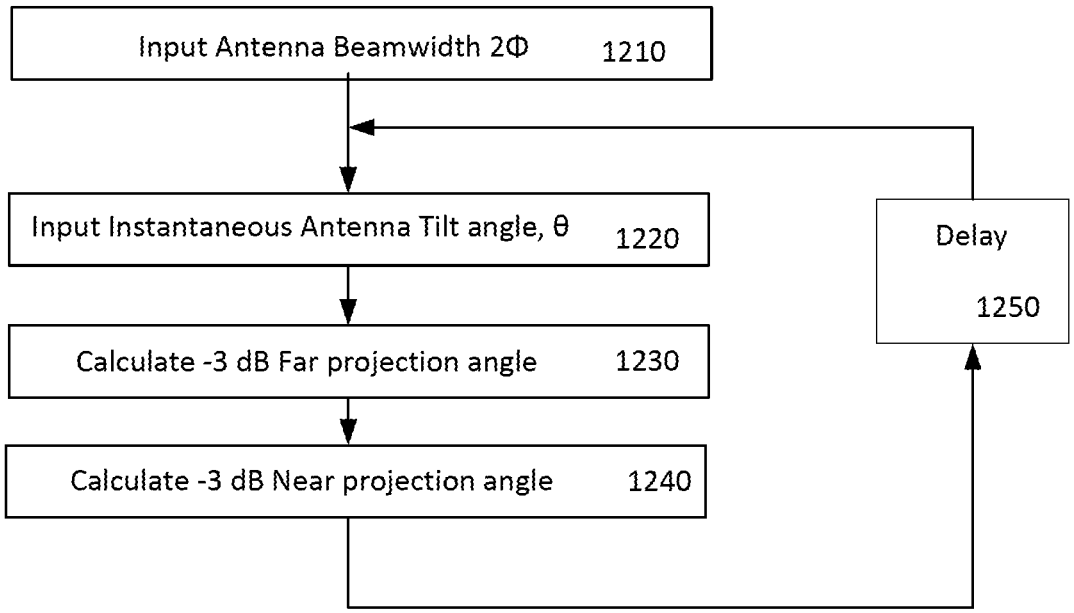
FIG. 12 is a flowchart of an exemplary method of determining −3 dB near and far projection angles according to an embodiment of the disclosure.

FIG. 12 is a flowchart of an exemplary method 1200 of determining −3 dB near and far projection angles according to an embodiment of the disclosure. Method 1200 takes the inputs, for example as received via keyboard/mouse 1137, for the antenna beam width and tilt angle and determines, via the processor 1132, the angles for the −3 dB far and near projections. The resultant values may then be used for a display, via display 1136, of the antenna footprint on the ground, also referred to herein as the ground coverage footprint. Method 1200 may start by step 1210 where the value, $2\Phi$, of the antenna beam width is inputted to a computer, via the keyboard/mouse 1137. The beam width of an antenna 1121 will be a fixed value. Step 1210 may be followed by step 1220 where the value for the antenna tilt angle is inputted, via the interface 1131 to the processing module 1135, or is calculated by the processor 1132. The tilt angle may vary and therefore the pitch value entered may be the instantaneous value. The antenna 1121 may be mounted in a gimballed system where the tilt angle may vary continuously or the antenna may be fixed such that the tilt angle is effectively steady. If mounted in an aircraft, subject to pitch and yaw, the movements of the aircraft may affect the tilt angle again in a continuous manner. If the antenna 1121 is mounted in an aircraft the tilt angle may be derived by a combination of input from external devices, such as GPS (Global Positioning System) and the aircraft instrumentation or the gyro 1160. Methods of deriving the tilt angle of the antenna 1121 are well known and do not form part of this disclosure. Step 1220 may be followed by step 1230 where the −3 dB far projection angle may be calculated, via the processor 1132, either by the use of equation (13) or by use of a look up table, such as Table 5. Step 1230 may be followed by step 1240 where the −3 dB near projection angle may be calculated, via the processor 1132, either by the use of equation (14) or by use of a look up table, such as Table 6. After step 1240 the method may return to step 1210 via step 1250 which may insert a delay before the process is repeated.

Figure 13:
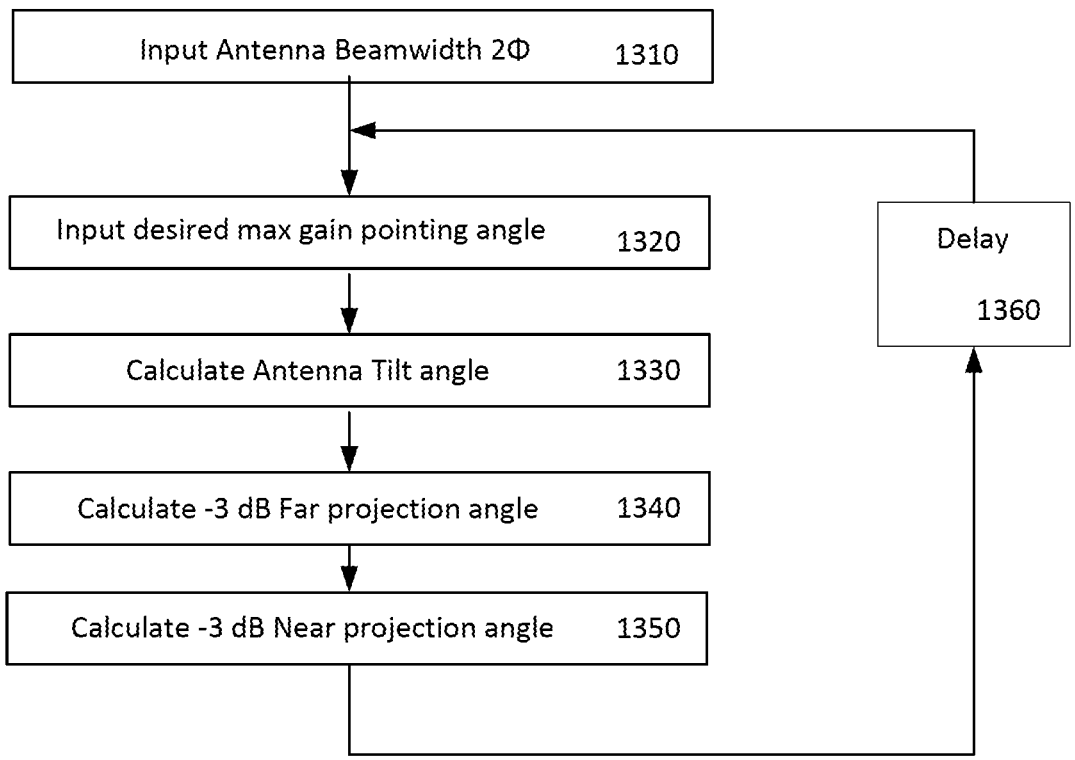
FIG. 13 is a flowchart of another exemplary method of determining −3 dB near and far projection angles according to an embodiment of the disclosure.

FIG. 13 is a flowchart of an exemplary method 1300 of determining a −3 dB near and far projection angles according to an embodiment of the disclosure. Method 1300 takes, via the keyboard/mouse 1137, the inputs for the antenna beam width and the desired maximum gain pointing angle and then calculates the angles for the −3 dB far and near projections. The resultant values may then be used for a display, via display 1136, of the antenna footprint on the ground. Method 1300 may start at step 1310 where the value, 2Φ, of the antenna beam width is inputted. The beam width of an antenna 1121 will be a fixed value. Step 1310 may be followed by step 1320 where the maximum gain pointing angle is inputted, via keyboard/mouse 1137. The desired pointing angle may be determined via the processor 1132 from the co-ordinates of a point on the ground and a combination of inputs from various devices on the aircraft such as GPS (Global Positioning System) and the aircraft instrumentation or the gyro 1160. Methods to determine the desired projection angle are well known and do not form part of this disclosure, Step 1320 may be followed by step 1330 where the value for the antenna tilt angle is calculated via the processor 1132. The tilt angle may be calculated via the processor 1132 using either equation (11) or by use of a look up table similar to Table 4. Step 1330 may be followed by step 1340 where the −3 dB far projection angle may be calculated via the processor 1132 either by the use of equation (13) or by use of a look up table, such as Table 5. Step 1340 may be followed by step 1350 where the −3 dB near projection angle may be calculated via the processor 1132 either by the use of equation (14) or by use of a look up table, such as Table 6. After step 1350 the method may return to step 1310 via step 1360 which may insert a delay before the process is repeated.

FIG. 14 is a flowchart of an exemplary process 1400 for pointing a beam of a directional antenna 1121 located above ground. The process includes receiving, at step 1402, a beam width 2ϕ. The process also includes determining, at step 1404, an angle $\psi_{max}$ such that $\psi_{max}+\theta$ is an angle for a projection of maximum signal strength on the ground, $\psi_{max}$ being based on the beam width 2ϕ and tilt angle θ. The process also includes determining, at step 1406, an effective ground beam width defined by a total relative gain of the directional antenna 1121 and the above the ground to ground range being at half the maximum signal strength on the ground at angles above and below $\psi_{max}$, The process further includes determining, at step 1408, a ground footprint of the beam of the directional antenna 1121 based at least on part on the determined effective ground beam width. The process also includes causing, at step 1410, the antenna 1121 to be pointed based at least in part on the determined ground footprint of the beam of the directional antenna 1121.

Some of the embodiments are described herein with reference to flowchart illustrations. It will be understood that each block of the flowchart illustrations can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart step or steps.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart step or steps.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart step or steps.

It is to be understood that the functions/acts noted in the steps may occur out of the order noted in the operational illustrations. For example, two steps shown in succession may in fact be executed substantially concurrently or the steps may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the beam width of the antenna may be defined based upon relative gain or gains compared the maximum gain other than 3 dB, the beam width may not be symmetrical about the projection of maximum gain, variations and steps of for the tilt angle, projection angle, pointing angle, and beam widths may be different than those depicted in the tables and graphs presented herein, variations in the derived approximation equations for the −3 dB projections. Accordingly, the scope should be determined not by the embodiments illustrated.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for pointing a beam of a directional antenna located above ground, the beam being projected downward toward the ground, the method comprising:
   receiving a beam width $2\phi$;
   determining an angle $\psi_{max}$ such that $\psi_{max}+\theta$ is an angle for a projection of maximum signal strength on the ground, $\psi_{max}$ being based on the beam width $2\phi$ and tilt angle $\theta$;
   determining an effective ground beam width defined by a total relative gain of the directional antenna and the above the ground to ground range being at half the maximum signal strength on the ground at angles above and below $\psi_{max}$;
   determining a ground footprint of the beam of the directional antenna based at least on part on the determined effective ground beam width; and
   causing the antenna to be pointed based at least in part on the determined ground footprint of the beam of the directional antenna.

2. The method of claim 1, wherein $\psi_{max}$ is determined from an arctangent of a root of a quadratic equation in terms of the tilt angle $\theta$ and a value N that is based on the beam width $2\phi$ according to the equation, N=Log (0.5)/Log (cos $\phi$).

3. The method of claim 1, wherein the maximum signal strength is determined based at least in part on a derivative of a relative total gain equation.

4. The method of claim 1, further comprising determining the tilt angle to be an angle for which a maximum signal strength is directed toward a selected point.

5. The method of claim 4, wherein the tilt angle is determined from a look up table.

6. The method of claim 5, wherein values in the lookup table are determined as follows:

$$\theta'=\rho-ATAN[2/(N \tan \rho)],$$

where $\rho$ is a pointing angle to the selected point.

7. The method of claim 1, wherein −3 dB near and far projection angles of the beam are determined by a linear function of one half the beam width $2\phi$ and the tilt angle $\theta$.

8. A computer for pointing a beam of a directional antenna located above ground, the beam being projected downward toward the ground, the computer including processing circuitry configured to:
   receive a beam width $2\phi$;
   determine an angle $\psi_{max}$ such that $\psi_{max}+\theta$ is an angle for a projection of maximum signal strength on the ground, $\psi_{max}$ being based on the beam width $2\phi$ and tilt angle $\theta$;
   determine an effective ground beam width defined by a total relative gain of the directional antenna and the above the ground to ground range being at half the maximum signal strength on the ground at angles above and below $\psi_{max}$;
   determining a ground footprint of the beam of the directional antenna based at least in part on the determined effective ground beam width; and
   cause the antenna to be pointed based at least in part on the determined ground footprint of the beam of the directional antenna.

9. The computer of claim 8, wherein $\psi_{max}$ is determined from an arctangent of a root of a quadratic equation in terms of the tilt angle $\theta$ and a value N that is based on the beam width $2\phi$ according to the equation, N=Log (0.5)/Log (cos $\phi$).

10. The computer of claim 8, wherein the maximum signal strength is determined based on a derivative of a relative total gain equation.

11. The computer of claim 8, wherein the processing circuitry is further configured to determine the tilt angle to be an angle for which a maximum signal strength is directed toward a selected point.

12. The computer of claim 11, wherein the tilt angle is determined from a look up table.

13. The computer of claim 12, wherein values in the lookup table are determined as follows:

$$\theta=\rho-ATAN[2/(N \tan \rho)],$$

where $\rho$ is a pointing angle to the selected point.

14. The computer of claim 8, wherein −3 dB near and far projection angles of the beam are determined by a linear function of one half the beam width $2\phi$ and the tilt angle $\theta$.

15. A method for pointing a beam of a directional antenna located above ground, the beam being directed downward toward the ground, the method comprising:
   determining a tilt angle $\theta$, the tilt angle $\theta$ being determined to be an angle for which a maximum signal strength on the ground is directed toward a selected point;
   receiving a beam width $2\phi$;
   determining an angle $\psi_{max}$ such that $\psi_{max}+\theta$ is an angle for a projection of maximum signal strength on the ground, $\psi_{max}$ being based on the beam width $2\phi$ and the tilt angle $\theta$; and
   determining an effective ground beam width defined by a total relative gain of the directional antenna and the above the ground to ground range being at half the maximum signal strength on the ground at angles above and below $\psi_{max}$;
   determining a ground footprint of the beam of the directional antenna based on the determined effective ground beam width; and
   causing the antenna to be pointed based at least in part on the determined ground footprint of the beam of the directional antenna.

16. The method of claim 15, wherein $\psi_{max}$ is determined from an arctangent of a root of a quadratic equation in terms of the tilt angle $\theta$ and a value N that is based on the beam width $2\phi$ according to the equation, N=Log (0.5)/Log (cos $\phi$).

17. The method of claim 16, wherein $\psi_{max}$ is determined as:

$$\psi\max = ATAN\frac{(N+2)\tan\theta - \sqrt{(2+N)^2\tan^2\theta + 8N}}{-2N}$$

18. The method of claim 17, wherein the tilt angle $\theta$ is determined as:

$$\theta=\rho-ATAN[2/(N \tan \rho)]$$

where $\rho$ is a pointing angle to the selected point.

19. The method of claim 15, wherein the maximum signal strength is determined based on a derivative of a relative total gain equation.

20. The method of claim 15, wherein the tilt angle is an angle for which a maximum signal strength is directed toward a selected point.

* * * * *